United States Patent [19]

Organ

[11] 3,758,566
[45] Sept. 11, 1973

[54] REMOVAL OF IRON IMPURITIES

[75] Inventor: Glenn Edward Organ, Bay City, Tex.

[73] Assignee: Celanese Corporation, New York, N.Y.

[22] Filed: Apr. 21, 1971

[21] Appl. No.: 136,195

[52] U.S. Cl. ........... 260/531 R, 260/537 P, 423/24, 423/63, 423/390, 423/139
[51] Int. Cl. ............................................. C07c 55/14
[58] Field of Search ....................... 260/531 R, 537; 252/414; 75/101 BE; 23/102 R, 22

[56] References Cited
UNITED STATES PATENTS 3,586,476  6/1971  Beutner et al. ................. 75/101 BE
3,554,692  1/1971  Brast ........................................ 23/22
3,320,032  5/1967  Feller ........................ 75/101 BE X
3,211,521  10/1965  George et al. ............... 75/101 BE X Primary Examiner—Lorraine A. Weinberger
Assistant Examiner—Richard D. Kelly
Attorney—Thomas J. Morgan, C. E. Miller, K. A. Genoni, M. Turken and R. M. Pritchett

[57] ABSTRACT

Iron impurities are removed from an aqueous nitric acid solution containing copper and vanadium catalyst ions by solvent extraction with an organic solution of an organo-phosphate prior to passing the aqueous nitric acid solution through an ion exchange zone for recovery of the copper and vanadium.

9 Claims, No Drawings

REMOVAL OF IRON IMPURITIES

BACKGROUND OF THE INVENTION

In the production of lower alkyl dicarboxylic acids by nitric acid oxidation there generally results a purge waste stream containing valuable metal ions therein of which recovery is desired if the process is to operate economically. These waste streams are generally derived from the mother liquor of one or more of the crystallizations involved in the production of the dicarboxylic acid and the necessity for purging arises because of the build-up of dibasic acids other than the one desired. For example, in the production of adipic acid small amounts of succinic and glutaric acids are also produced and thus a purge of one of the recycled streams is necessary to prevent build-up of these impurities. The purge stream usually is an aqueous nitric acid solution which contains, in addition to the dibasic acid impurities, other more valuable constituents, namely various metal ions derived from the catalyst used in the oxidation reaction. It is obvious that in view of the value of such catalyst metals recovery of these from the purge stream is desirable before discarding the purge stream.

Various methods, in fact, have been developed for recovery of such metals from these purge streams as may be seen from U. S. Pat. Nos. 3,106,450 and 3,463,740. Also see British Pat. specifications Nos. 980762 and 956403. The most popular of the methods for the recovery of the metals from a purge waste acid stream is by passing this stream through an ion exchange treatment zone whereby the metals are bound to the exchanger and then the metals recovered by passing nitric acid over the exchanger. The stream resulting from the regeneration of the exchanger consists essentially of the nitric acid solution with the metals therein and, therefore, can be recycled to the oxidation process. While the aforementioned references disclose effective methods for the recovery of catalyst metal values, they do not provide a method for dealing with the problem of iron contamination which generally results from the ferrous alloys used in the process equipment. Unless the iron is removed, it will ultimately accumulate to such an extent that there will be contaimination in the final dicarboxylic acid product.

U. S. Pat. No. 3,186,952 recognizes the problem of iron contamination and presents a method for coping with it which consists essentially of employing two or more resin beds in series. Iron is allowed to accumulate in the first bed while the later beds retain the catalyst metal ions. Although such a method is effective, it necessitates an extra ion exchange bed over that normally required to recover the catalysts. An element of uncertainty is also present in such a method since iron frequently bleeds through the first bed. Thus it may be seen that there is a need for new and efficient methods for dealing with the problem of iron contamination in processes for the recovery of catalyst metals.

SUMMARY

It is thus an object of the present invention to provide a novel method for selectively removing iron impurities from solutions containing catalyst metal ions such as copper and vanadium. It is a further object of the present invention to improve the process wherein catalyst metals are recovered in an ion exchange zone from aqueous nitric acid solutions such as those derived from the nitric acid oxidation of cyclohexanol or cyclohexanone. Additional objects will become apparent from the following description of the present invention.

These and other objects are accomplished by the present invention which, in one of its aspects, is an improvement in a process wherein a liquid aqueous nitric acid solution containing catalyst metals selected from the group consisting of copper, vanadium and mixtrues thereof, and also containing iron impurities, is passed through an ion exchange treatment zone for removal of at least one of said catalyst metals from said aqueous nitric acid solution, which improvement comprises intimately contacting said aqueous nitric acid solution prior to passing same through said ion exchange treatment zone with a liquid, immiscible, organic solution comprising an organic ester of orthophosphoric acid dissolved in an inert, water-immiscible organic solvent, whereby said iron impurities are preferentially transferred into said immiscible organic solution, followed by the step of separation the immiscible organic solution enriched in said iron impurities from said aqueous nitric acid solution.

DESCRIPTION OF THE PREFERRED EMBODIMENTS

Although the aqueous nitric acid solution treated in accordance with the present invention for the removal of iron impuriites therefrom can be practically any aqueous nitric acid solution containing catalyst metal ions therein, the invention is most applicable to those aqueous solutions derived from a process in which adipic acid is recovered by crystallization from the product obtained by nitric acid oxidation of cyclohexanol and/or cyclohexanone in the presence of a metal-containing catalyst. Such aqueous nitric acid solutions, as pointed out in the previously cited prior art, generally contain in addition to the nitric acid various amounts of lower alkyl dicarboxylic acids such as adipic acid, succinic acid and glutaric acid. The presence or absence of such dicarboxylic acids does not, however, affect the present process since these acids are not noticeably affected by the reaction of the stream with formaldehyde and such dicarboxylic acids pass practically completely through the ion exchanger. Such dicarboxylic acids may, if desired, be recovered from the resulting solution in any known manner such as by evaporation or conversion to esters or other derivatives. As far as specific concentrations are concerned, the present invention will be most applicable to the treatment of those aqueous nitric acid solutions containing from about 5 to 40 weight per cent of nitric acid, from about 2 to 30 weight per cent lower alkyl dicarboxylic acids and 0.05 to 1.5 weight per cent metal ions. The particular catalyst metal ions present will depend on the catalyst used in nitric acid oxidation but most often will include copper and also vanadium, especially when adipic acid is being produced. For example, a typical purge waste stream from an adipic acid process will contain by weight 10 to 35 percent nitric acid, 10 to 25 percent lower alkyl dicarboxylic acids (e.g., 5 to 15 percent glutaric, 1 to 10 percent succinic, 1 to 10 percent adipic), 0.1 to 1.0 percent copper and 0.01 to 0.1 percent vanadium, the remainder being essentially water.

Of course the solutions of nitric acid treated in accordance with the invention will also contain iron impurities, these generally being present in the form of ferric ions. The amount of iron present will vary from process to process and plant to plant, most of the iron coming from process equipment. Typically the solutions to be treated will contain from 40 to 200 p.p.m. (parts per million by weight) of iron although the present invention can be effectively used to treat solutions containing lesser or much greater amounts of iron, for example, 1 to 2,000 p.p.m.

The removal of the iron impurities from the aqueous nitric acid solution prior to passing the solution through the ion exchanger is accomplished by extraction with a solution of an organic orthophosphate. These organic orthophosphates are the organic esters of orthophosphoric acid and may be those wherein one, two, or all three of the hydrogens of orthophosphoric acid are substituted by organic groups. The suitable esters will generally be of the formula

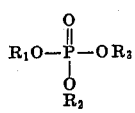

$$R_1O-\overset{\overset{O}{\|}}{\underset{\underset{R_2}{O}}{P}}-OR_3 \qquad I$$

wherein $R_1$ is a hydrocarbon group while $R_2$ and $R_3$ are hydrogen or hydrocarbon groups. These hydrocarbon groups may be aromatic or non-aromatic in nature and generally will contain from one to 12, more usually four to 10, carbon atoms each. Preferably they are free of ethylenic and acetylenic unsaturation and thus will be alkyl, alkaryl, aralkyl, aryl, or cycloalkyl radicals. Best results have been obtained with those orthophosphates wherein in Formula I above $R_1$ is an alkyl group while $R_2$ and $R_3$ are hydrogen or alkyl groups. It has been found that those orthophosphates which are water-insoluble give the best results since a portion of the water soluble phosphates sometime migrate into the aqueous nitric acid solution with a resulting reduction in efficiency. By "water-insoluble" as used in reference to the orthophosphates is meant those having a solubility of less than about 3 grams per 100 ml of water at 25° C. Most phosphates of the above Formula I are in fact water-insoluble except those wherein all three hydrogens of the phosphoric acid, that is $R_1$, $R_2$ and $R_3$ in Formula I above, are substituted with alkyl groups containing one to three carbon atoms. Those wherein only one or two of the hydrogens are substituted are considered to be water-insoluble even when the substituents contain only one or two carbons, for example diethyl hydrogen phosphate. The especially preferred orthophosphates for use in the present invention are those wherein in Formula I above, $R_1$, $R_2$ and $R_3$ are alkyl groups of four to 10 carbon atoms.

Mixtures of different orthophosphates may be utilized and also the mixed esters of phosphoric acid may be used, the latter being those wherein one hydrogen of the phosphoric acid is substituted with one organic radical while the other one or two hydrogens are substituted with difficult organic radicals. Specific organic orthophosphates that may be used are diethyl hydrogen phosphate, dibutyl hydrogen phosphate, tributyl phosphate, tri-2-ethylhexyl phosphate, 2-ethylhexyl diphenyl phosphate, tricresyl phosphate, cresyl diphenyl phosphate, triphenyl phosphate, and tridecyl phosphate.

The organic orthophosphate must be dissolved in a liquid organic solvent with the main requirement being that the solvent is inert and water-immiscible. By "inert" is meant that it is not reactive to any appreciable extent under the extraction process conditions with itself, the organic orthophosphate, or the aqueous nitric acid solution-including the constituents therein. By the term "water-immiscible" is meant that the solvent is relatively insoluble in water, for example less than about 5 ml per 100 ml of water at 25° C. Those organic solvents most suitable are the monohydric alkanols, dialkyl ethers, normally liquid hydrocarbons or alkanones having a single carbonyl group.

If a monohydric alkanol is used, it should have at least four carbon atoms, preferably 5 to 10, since those having four carbon atoms or less are relatively water-soluble, tertiary-butanol being the most soluble of the butyl alcohols. Some of those alkanols having over four carbon atoms are also too water-soluble for use in the invention but such can easily be determined from the literature. Examples of suitable alcohols are 3-methyl-1-pentanol, 2,4-dimethyl-2-pentanol, 1-pentanol, 2-methyl-2-heptanol, 4-heptanol, 4-propyl-4-heptanol, 2-octanol, 1-hexanol, and 2-ethyl-1-hexanol. The dialkyl ethers which are water-immiscible generally will contain at least six carbon atoms, that is the total of the carbon atoms in both alkyl groups will be at least six carbon atoms and preferably these ethers will contain six to 15 carbon atoms. Butyl ethyl ether, dibutyl ether, di-n-amyl ether, isopropyl ether, di-n-propyl ether, di-n-heptyl ether, ethyl hexyl ether, and heptyl methyl ether are examples of suitable ethers.

The normally liquid hydrocarbons suitable are too numerous to mention in detail since hydrocarbon cuts, such as kerosene, from a refinery are suitable and which may contain dozens or even hundreds of different hydrocarbons. By normally liquid is meant that the boiling point of the hydrocarbon or hydrocarbon mixture is above 20° C. at atmospheric pressure. Practically all of the normally liquid hydrocarbons are immiscible with water with those relatively free of ethylenic and acetylenic unsaturation being preferred. Suitable hydrocarbons include hexane, cyclohexane, benzene, kerosene, gasoline, octane, decane, 2-ethylhexane, and toluene.

The alkanones suitable are those having a single carbonyl group and may be acyclic in nature or may be a cycloaklanone. Preferably the alkanone is of six to 15 carbon atoms. Among those which may be utilized are cyclohexanone, dibutyl ketone, dihexyl ketone, 2-methylcyclohexanone, diheptyl ketone, isobutyl propyl ketone, and the like.

The solution of the organic orthophosphate in the organic solent may contain varying aoounts of the orthophosphate dissolved therein. Generally good results will be obtained with those solutions containing from about 5 to 50 weight per cent of the organic orthophosphates based on the total weight of solvent and orthophosphates present. However, for optimum results it is recommended that the solution of the orthophosphate contain from about 15 to 35 weight per cent thereof. The amount of the organic orthophosphate solution to be contacted with the iron-containing aqueous nitric acid solution should be such that at least 25 parts by weight, for example 25 to 2,000 parts by weight, of the orthophosphate is provided per part by weight of iron present in the aqueous nitric acid solution. Preferably about 50 to 500 parts by weight of the orthophosphate is provided per part by weight of the iron.

In accomplishing the intimate contact of the organic solution with the aqueous nitric acid solution so as to extract the iron impurities therefrom, the temperature should generally be within the range of 0° to 100° C., preferably 20° to 60° C. The pressure needs only to be sufficient to prevent boiling and maintain a liquid phase and may be subatmospheric, atmsopheric, or superatomospheric. The main requirement is that the aqueous nitric acid solution and the organic solution of the orthophosphate be brought together in an extraction zone and intimately contacted there so as to permit the iron impurities to transfer into the organic solution. The catalyst metal ions such as copper and vanadium as well as the other constituents present in the aqueous nitric acid solution are relatively unaffected by the organic solution of the orthophosphate.

The extraction equipment used may be operated batch-wise or continuously with a continuous process being preferred. Representative types of equipment that may be utilized in both batch operations and continuous operations include mixer-settlers, vertical towers of various kinds which operate by gravity flow, agitated tower extractors and centrifugal extractors. When using a tower extractor operated by gravity flow, such as a vertical tower having packing, baffles or plates therein, the heavier phase will typically be introduced into an upper point of the tower while the lighter phase is introduced at a lower point in the tower. In the present invention, whether or not the aqueous nitric acid solution will be the heavier phase or the lighter phase will depend on the particular organic solvent utilized; however, in most cases the aqueous nitric acid solution will be the heavier phase. Assuming that the aqueous nitric acid solution is the heavier phase, it will be introduced at an upper point in the tower while the organic solution of the orthophosphate is introduced at a lower point in the tower. The organic solution, being lighter, then passes up through the tower while being intimately contacted with the descending aqueous solution. The organic solution having preferentially extracted the iron impurities, is then withdrawn from the top of the tower as the extract phase while the raffinate phase comprised mainly of the aqueous nitric acid solution is withdrawn from the bottom of the tower.

After the extraction of the iron impurities there will be left an aqueous nitric acid solution having a lower iron constant than that originally treated. This aqueous solution will also contain the catalyst metals, lower dicarboxylic acids, etc., that were in the original nitric acid stream. This resulting aqueous solution can then be passed through an ion exchange treatment zone for removal of the metals present, such as copper and vanadium. The nature of the ion exchange resin employed in utilizing this invention is well-known and may vary considerably, although certain types of resin are generally preferred over others. Any of the hydrogen-form cation exchange resins disclosed in the prior art for recovering metals such as copper and vanadium can be employed. Any resin which can be employed in alternating cycles of metal absorption followed by mineral acid elution as taught in the prior art can also be employed in the presnt process. For example, U. S. Pat. No. 3,186,952 characterizes the applicable resins broadly as "water-insoluble polymerizate" cation exchange resins, and this term characterizes broadly the resins which are also applicable in the present process. More particularly the resins employed are those having a base comprising sulfonated polyvinyl aryl compounds which are cross-linked with a divinyl aryl compound. Specifically preferred resins include those which comprise sulfonated polystyrene cross-linked with divinylbenzene in an amount of about 8 to 25 weight per cent based on the weight of the resin. Commercially available resins include "Amberlite IR-200" manufactured by Rohm and Haas Company and "Dowex 50w-X8," "Dowex 50-X16," and "Dow SA1101.1," all manufactured by Dow Chemical Company. Many other similar resins are manufactured and can be utilized in the present process, but the resins just named are typical and illustrate the recommended materials. "Amberlite IR-200" has been found to be particularly suitable.

The geometye of the resin bed, and the space velocity to be employed in passing the aqueous feed solution through it, are not critical, nor is the particle size of the resin.

The bed is, of course, activated to its hydrogen form by treatment with a strong acid prior to passing the aqueous feed solution through it. When the ion exchange resin is exhausted as indicated by breakthrough of the catalyst metals, it may be regenerated by known methods particularly by passing aqueous nitric acid solution therethrough. The eluate will then be a nitric acid solution of the catalyst metal ions and will be a suitable source of catalyst for a nitric acid oxidation process.

If the contact of the aqueous nitric acid solution and the organic phosphate solution is conducted at elevated temperatures above about 50° C., then the purified aqueous nitric acid solution is preferably cooled to below 50° C. before passing it through the ion exchange treatment zone. The reason for this is that there may be a tendency toward resin deterioration above about 50° C.

In the recovery of the catalyst metals by ion exchange the pH of the solution should generally be within the range of −0.3 to 2.0, preferably 0 to 0.2. If the nitric acid solution to be treated is not within the desired range, the pH may be adjusted before or after the extraction treatment. The extraction treatment itself may be conducted over a wider pH range than the ion exchange, for example a pH of −0.3 to 5.0. Preferably, however, it is accomplished at the same pH ranges applicable to the ion exchange treatment.

The following example illustrates specific embodiments of the present invention but are not to be taken as limiting the scope thereof.

EXAMPLE I

An organic solution formed by dissolving 5 grams of tri-2-ethylhexyl phosphate in 10 grams of 2-ethylhexyl alcohol solvent was used to extract iron impurities from 500 milliliters of an aqueous nitric acid solution. The nitric acid solution was a purge stream from an adipic acid process wherein mixtures of cyclohexanol and cyclohexanone were oxidized with nitric acid in the presence of a copper-vanadium catalyst. The aqueous nitric acid solution was of a pH of about −0.2 and contained by weight about 10 percent nitric acid, 10 percent glutaric acid, 3 percent succinic acid, 3 percent adipic acid, 0.4 percent copper, 0.04 percent vanadium and 50 p.p.m. of iron.

In accomplishing the extraction, the organic solution was combined only with 100 milliliters of the nitric acid solution at a time, shaken for about 30 seconds to insure intimate contact of the two phases and then the organic and aqueous phases allowed to layer, the organic phase being the upper layer. The organic phase was then separated from the aqueous nitric acid solution and then combined with another 100 milliliters of the aqueous nitric acid solution and the above procedure repeated until all 500 milliliters of the aqueous nitric acid solution had been treated for the removal of iron. The 500 milliliters of aqueous nitric acid solution thus treated was analyzed with the analysis indicating the presence of only about 1 p.p.m. iron while the copper, vanadium and dicarboxylic acid content was essentially that originally present.

The thus treated 500 milliliters of aqueous nitric acid solution was then passed through an ion exchange resin bed prepared from fresh dowex 50x–X8 resin and activated with 50 percent nitric acid. Dowex 50x–X8 is manufactured by Dow Chemical Compnay and is sulfonated polystyrene crosslinked with divinylbenzene. The bed was three-fourths inch in diameter, 15 inches in height and contained 50 grams of resin. Feed rate to the bed was about 10 milliliters per minute. The effluent from the bed contained only about 0.02 percent copper and 0.02 percent vanadium. The iron content of the effluent was below detectible limits.

EXAMPLE II

The extraction procedure utilized in Example I above was repeated on 300 grams of aqueous nitric acid solution having a composition essentially that of Example I except that there were 75 p.p.m. iron impurities present. Also the organic solution utilized was 8.4 grams of a 25 weight per cent solution of dibutylphosphate in 2-ethylhexanol. The 300 milliliters of aqueous nitric acid so treated contains only about 7 p.p.m. of iron after the extraction treatment.

The embodiments of the invention in which an exclusive property or priviledge is claimed are defined as follows:

1. In a process wherein a liquid aqueous nitric acid solution containing catalyst metals selected from the group consisting of copper, vanadium and mixtures thereof, and also containing iron impurities, is passed through an ion exchange treatment zone for removal of at least one of said catalyst metals from said aqueous nitric acid solution, the improvement which comprises intimately contacting said aqueous nitric acid solution prior to passing same through said ion exchange treatment zone with a liquid, immiscible, organic solution consisting essentially of a water-insoluble organic ester of orthophosphoric acid dissolved in an inert, water-immiscible organic solvent, whereby said iron impurities are preferentially transferred into said immiscible organic solution, followed by the step of separating the immiscible organic solution enriched in said iron impurities from said aqueous nitric acid solution, said ester being of the formula

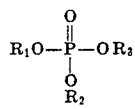

wherein $R_1$, $R_2$, and $R_3$ are alkyl groups four to 10 carbon atoms.

2. The process of claim 1 wherein the amount of said organic solution contacted with said aqueous nitric acid solution is sufficient to provide at least 25 parts by weight of said organic ester of orthophosphoric acid per part by weight of iron present in said aqueous nitric acid solution.

3. The process of claim 1 wherein said organic solvent is normally liquid hydrocarbon solvent.

4. The process of Claim 1 wherein said organic solvent is a water-immiscible, monohydric alkanol of five to 10 carbon atoms.

5. The process of claim 1 wherein said aqueous nitric acid solution contains by weight from about 10 to 35 percent nitric acid, 10 to 25 percent lower alkyl dicarboxylic acids, 0.1 to 1.0 percent copper and 0.01 to 0.1 percent vanadium, and is derived from a process wherein adipic acid is recovered by crystallization from the product obtained by the nitric acid oxidation of cyclohexanone, cyclohexanol or mixtures thereof in the presence of a catalyst containing copper and vanadium.

6. The process of claim 5 wherein said organic solvent is a monohydric alkanol of five to 10 carbon atoms, a dialkyl ether of six to 15 carbon atoms, a normally liquid hydrocarbon or an alkanone of six to 15 carbon atoms having a single carbonyl group.

7. The process of claim 6 wherein the intimate contact of said aqueous nitric acid solution and said immiscible organic solution is accomplished at a temperature within the range of 20° C. to 60° C., a pressure sufficient to prevent boiling, and wherein the amount of said immiscible organic solution contacted with said aqueous nitric acid solution is sufficient to provide from 50 to 500 parts by weight of said organic ester of orthophosphoric acid per part by weight of iron present in said aqueous nitric acid solution.

8. The process of claim 7 wherein said organic solvent is a water immiscible, monohydric alkanol of five to 10 carbon atoms.

9. The process of claim 7 wherein said organic solvent is a normally liquid hydrocarbon.

* * * * *

UNITED STATES PATENT OFFICE
CERTIFICATE OF CORRECTION

Patent No. 3,758,566   Dated September 11, 1973

Inventor(s) Glenn Edward Organ

It is certified that error appears in the above-identified patent and that said Letters Patent are hereby corrected as shown below:

In column 3, line 60, for "difficult" read -- different --.

In column 5, line 47, for "constant" read -- content --.

In column 6, line 15, for "geometye" read -- geometry --.

Signed and sealed this 25th day of December 1973.

(SEAL)
Attest:

EDWARD M. FLETCHER, JR.
Attesting Officer

RENE D. TEGTMEYER
Acting Commissioner of Patents